United States Patent [19]

Brown

[11] Patent Number: 4,621,185
[45] Date of Patent: Nov. 4, 1986

[54] ADAPTIVE WELDING APPARATUS HAVING FILL CONTROL CORRECTION FOR CURVILINEAR WELD GROOVES

[75] Inventor: Ronald D. Brown, Mapleton, Ill.

[73] Assignee: Caterpillar, Inc., Peoria, Ill.

[21] Appl. No.: 803,518

[22] Filed: Dec. 2, 1985

Related U.S. Application Data

[63] Continuation of Ser. No. 705,151, Feb. 25, 1985, abandoned.

[51] Int. Cl.$^4$ ................................................ B23K 9/12
[52] U.S. Cl. .......................... 219/124.34; 219/124.22; 219/137.71; 318/577
[58] Field of Search ..................... 219/124.34, 124.22, 219/137.71; 318/576, 577

[56] References Cited

U.S. PATENT DOCUMENTS

| | | | |
|---|---|---|---|
| 4,394,559 | 7/1983 | Nomura et al. | 219/137.71 |
| 4,477,713 | 10/1984 | Cook et al. | 219/124.34 |
| 4,491,718 | 1/1985 | Cook et al. | 219/124.22 |
| 4,501,950 | 2/1985 | Richardson | 219/124.34 |

Primary Examiner—Clifford C. Shaw
Attorney, Agent, or Firm—Terry D. Morgan

[57] ABSTRACT

An adaptive welding apparatus has an optical sensing system for detecting the cross sectional configuration of a weld groove by linearly scanning a monochromatic light source across the groove while viewing the reflected light with a raster scan type TV camera. A microprocessor receives signals form the camera, computes the weld groove cross sectional configuration, and calculates the area of the cross section. The angular deviation of the scan path is estimated and corrective calculations are made to compensate for the erroneously large computed area caused by the scan path being skewed from perpendicular to the weld groove. The microprocessor controls at least one of the wire feed speed, travel speed, and voltage to effect proper weld groove fill characteristics in response to the calculated area.

9 Claims, 12 Drawing Figures

ADAPTIVE WELDING APPARATUS HAVING FILL CONTROL CORRECTION FOR CURVILINEAR WELD GROOVES

This is a continuation of Ser. No. 705,151, filed Feb. 25, 1985, now abandoned.

TECHNICAL FIELD

This invention relates generally to an adaptive welding apparatus for sensing the cross sectional area of a curvilinear weld groove and controlling at least one of the weld voltage, wire feed speed, and welding torch travel speed to fill the weld groove and, more particularly, for correcting ambiguities in the sensed cross sectional area due to a skewed sensing path which does not orthogonally traverse the weld groove.

BACKGROUND ART

In the field of adaptive welding, it is of paramount importance to accurately control the weld voltage, wire feed speed, and welding torch travel speed to maintain a desired weld material deposition rate. The cross sectional area of a weld groove is directly tied to the deposition rate and, therefor, it is necessary to precisely determine the groove area and adjust the weld parameters accordingly. Measurements are taken on a periodic basis along the weld groove to account for changes known to occur in weld groove areas. These measurements are accomplished by scanning a sensing element (e.g., optical, inductive, capacative, etc.) along a path extending across the weld groove and detecting the cross sectional configuration. The groove area is then determined from the cross section. This method of controlling fill characteristics has worked well in conjunction with linear weld grooves, consistently filling grooves to the proper level within the physical limitations of the welder and ardently avoiding the obvious problems associated with underfilling a weld groove. However, problems of equal import arise when this system is used on a curvilinear weld groove. In a curved portion of the groove, the actual path scanned by the sensing element will be skewed from the desired scan path which orthogonally traverses the groove. By crossing the groove at a skewed angle, the sensor detects a larger weld groove than actually exists. The erroneously large weld groove causes the system to adjust the welding parameters to an unnecessarily large weld material deposition rate, overfilling the weld grooves.

The denigrating effect of overfilling weld grooves extends beyond the loss of aesthetic value; however, many companies spend tremendous amounts of time, money, and effort on grinding off the excess weld material purely for appearance sake. Further, industries involved in steel fabrication allocate a significant portion of available funds directly to the purchase of consumable weld material. A small percentage savings realized by not overfilling weld grooves translates into a large recurring dollar savings on an annual basis. Moreover, overfilling weld grooves can result in a poor fit between parts and an excessive scrap or rework rate.

The present invention is directed to overcoming one or more of the problems as set forth above.

DISCLOSURE OF THE INVENTION

In accordance with one aspect of the present invention, a welding apparatus guides a welding torch along a weld groove, scans a sensor along a preselected pathway which extends across the weld groove at a preselected distance from the welding torch, and adaptively controls at least one of a weld voltage, a wire feed speed, and a welding torch travel speed in response to the scanned weld groove cross sectional area. A first means delivers first signals in response to the position and configuration of the weld groove cross section. A second means receives the first signals, calculates the weld groove cross sectional area, and delivers a second signal in response to the magnitude of the computed area. A third means receives the second signal, calculates a general angular deviation of the scanned pathway from a line perpendicular to the weld groove, alters the second signal in response to the angular deviation, and delivers a resulting third signal. A fourth means receives the third signal and controls the volume of weld material deposited in the weld groove in response to the third signal.

Previous adaptive welding appartus have been primarily concerned with the fill characteristics of linear weld grooves, with little or no consideration to the skewing effect of the sensing element during the tracking and welding of curvilinear weld grooves. Neglecting this phenomena leads to weld grooves which are overfilled and display less than ideal weld characteristics. The present invention is directed to an apparatus for providing the proper weld metal deposition rate for curvilinear weld grooves as well as linear weld grooves.

BEST MODE FOR CARRYING OUT THE INVENTION

Figure 1:
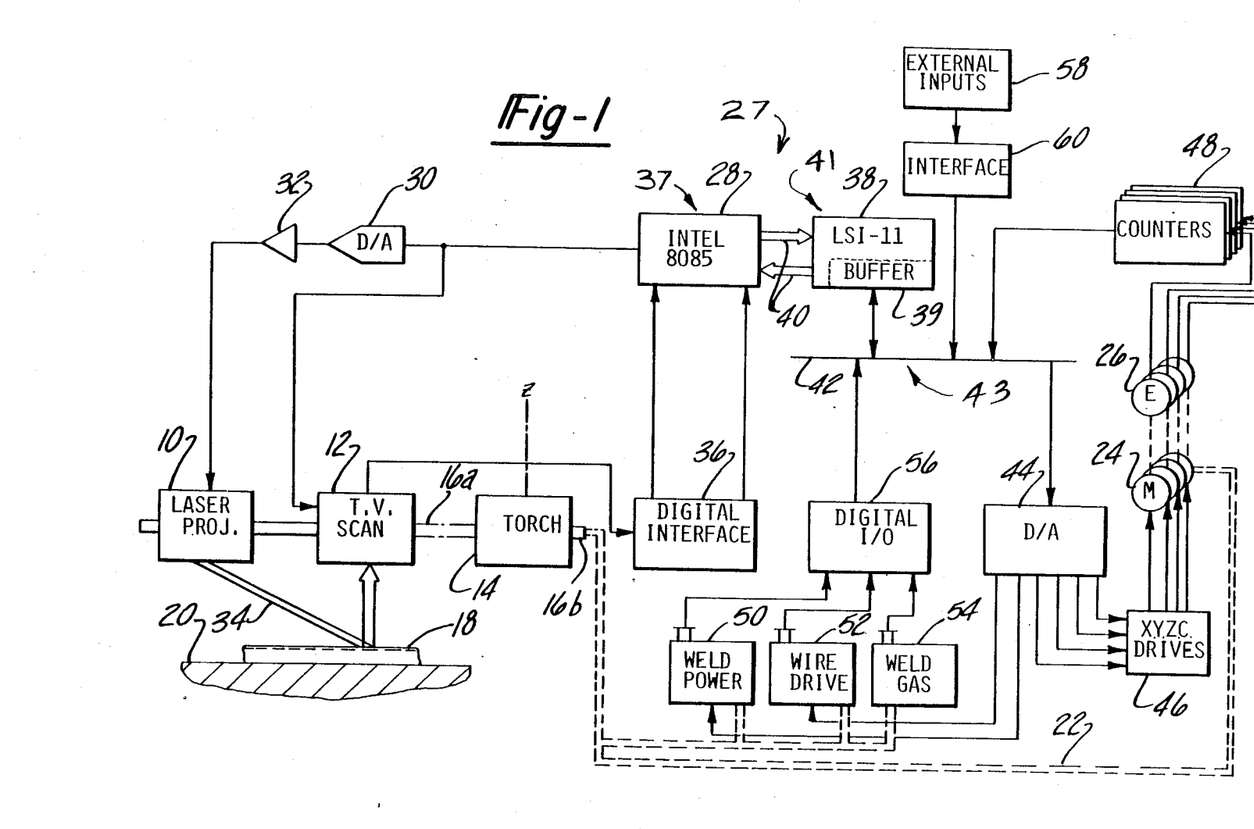
FIG. 1 is a block diagram of an adaptive welding system embodying the invention.

An adaptive welding apparatus 8 for guiding a welding torch 14 along a welding groove is shown in FIG. 1. A laser projector 10 and a raster-scanning type TV camera 12, such as General Electric TN 2500, make up sensor 13 and are mounted along with the MIG-type wire welding torch 14 on a movable platform 16a, 16b for controlled motion relative to a workpiece 18 which lies on a fixed support 20. The support 20 lies within a three-axis (Cartesian) coordinate system of which the Z or vertical axis extends along the centerline of the torch 14. The break between platform portions 16a and 16b indicates a fourth degree of freedom so that the projector 10 and scanner 12 can rotate or "swing" about the Z-axis and the sensor 13 can follow a weld groove without disturbing the X,Y coordinates of the torch.

The platform 16 is mechanically connected, as represented at 22, to axis drive motors 24 which move the platform 16 in the desired direction, to the desired degree and at the desired rate in following a weld groove in the workpiece 18. Encoders 26 monitor the extent and direction of rotation of the motors 24 in the conventional servo-positioning fashion and keep track of the relationship between commanded positions and actual positions of the platform 16 along the X,Y,Z axes and about the Z axis.

A first means 27 moves a sensing element 29 along a preselected pathway which extends across the weld groove, senses the weld groove cross sectional configuration, and delivers signals in response to the position and configuration of the weld groove cross section. The first means 27 can include, for example, an Intel 8085 digital computer 28 connected through a digital-to-analog converter 30 and amplifier 32 to a galvanometer-type mirror drive means in the projector 10 which causes a beam 34 of monochromatic light to be projected at an angle onto the workpiece 18 forming a spot of laser light which moves linearly across the weld groove at a controlled rate, as hereinafter described in more detail with reference to FIGS. 2 and 3. The reflection of the beam 34 from the surface of the workpiece 18 is received by the TV-camera scanner 12, also described in more detail with reference to FIGS. 2 and 3, and produces a digital data stream which is operated on by the interface 36 which provides data to the Intel 8085 computer 28 representing the peak intensity locations of the laser beam reflection at controlled time intervals. Those skilled in the art of noncontacting sensor design will recognize that other types of sensing elements 29 such as inductive, capacitive, or other optical designs can be used without departing from the spirit of the invention.

A second means 37 receives the signals representing peak intensity locations, determines relative locations of preselected points on said weld groove, calculates the weld groove cross sectional area, and delivers a second signal in response to the magnitude of the calculated area. The second means 37 can include, for example, a portion of the software used by the Intel computer 28 which generates a set of ten signals and provides these signals to a third means 41 via an RS-232C data link 40. The ten signals are:

(1) position of center of groove area along the laser scan;
(2) position of left edge of the groove;
(3) position of right edge of the groove;
(4) height of left edge;
(5) height of right edge;
(6) depth of groove;
(7) area of groove;
(8) check sum;
(9) end of message; and
(10) sync signal The computer 38 is connected via a bus 42 to the D/A converter 44 and provides signals to the X,Y,Z, and C (swing) axis drives 46 which operate the motors 24 and guide the torch 14 within the weld groove. The scanner 12 looks ahead of the torch 14 by a preselected distance, for example, in the embodiment shown, the scanner 12 precedes the torch 14 by a distance segment of about 4 inches; consequently, a store of about 20 position commands, each representing a portion of the 4 inch segment (e.g. approximately 0.2 inches), is placed in a ring-buffer 39 in the computer 38 and output to the axis drives 46 on a FIFO basis which moves the platform 16 at the desired rate and in the appropriate direction. In addition to controlling the lateral positioning of the weld torch 14, the average of the Z coordinates of the left and right weld groove edges provides a vertical guidance point toward which the torch 14 is directed by the computer 38. Counters 48 maintain a current count of position-increment pulses from the encoders 26 which represent the current position of the torch 14 and platform 16 within the coordinate system. This data is fed back to the computer 38 via the bus 42 and compared to position commands and generate error signals in conventional servo fashion.

A third means 41 receives the second signal, calculates a general angular deviation of the scanned pathway from a line perpendicular to the weld groove, alters the second signal in response to the magnitude of the angular deviation, and delivers a resulting third signal. The third means 41 can include, for example, a portion of the software used by the computer 38 and described in greater detail in conjunction with the flowcharts of FIG. 5.

A fourth means 43 receives the third signal and controls the volume of weld material deposited in the weld groove in response to the third signal. The fourth means 43 can include, for example, a portion of the software used by the computer 38 which provides weld-fill control signals via a converter 44 to a weld power controller 50 and a wire drive unit 52 varying the welding parameters according to a desired end result, e.g., to achieve a certain pre-established fill percentage. The controller 50, wire drive unit 52 and a welding gas control solenoid 54 all have on-off controls, such as pushbuttons, which are connected via an I/O unit 56 to the bus 42 and advise the computer 38 that these units are or are not in condition for control by the computer 38. Although shown in the drawing as being on the units themselves, the on-off pushbuttons are preferably mounted on a remote control panel.

Conventional external inputs such as jog, tape drive, and keyboard inputs may be entered via a unit 58 and an interface 60 associated therewith.

The simultaneous, coordinated control of the tracking and weld-fill functions is an important feature of the system as it provides not only variability in the selection of weld characteristics, but also compensates for relatively wide variations in the groove itself. For example, parts are commonly held together prior to final welding by manually placing a number of tack welds along the groove. The present system senses the material build-up of these tack welds as variations in weld area and varies the deposition rate in the area of each tack and prevents overfilling. Moreover, the vertical guidance point is unaffected by changes in the area or depth of the weld groove and maintains the torch 14 at the average height of the left and right groove edges. This action provides the added benefit of "burning through" or melting the previous tack welds and provides better welding characteristics without over-filling the existing groove. Systems which maintain the welding torch 14 at a constant height above the bottom of the groove will raise the torch 14 over tack welds providing less than ideal welds.

Figure 2:
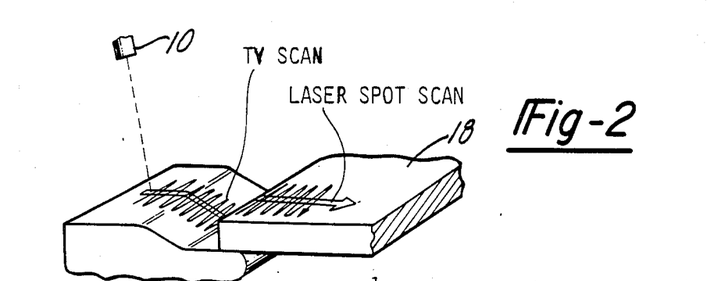
FIG. 2 is a detailed drawing representing the light spot and TV scanning functions of the optical apparatus in the system of FIG. 1.
Figure 2A:
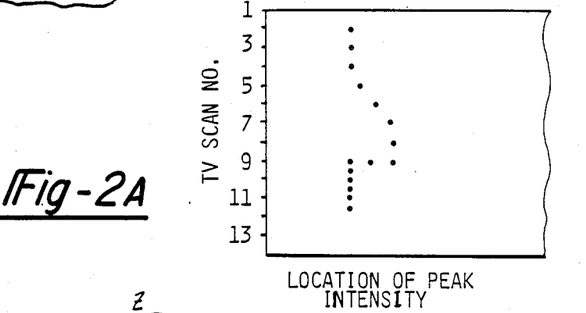
FIG. 2A is a representation of a digital weld groove scan using the apparatus of FIG. 1 in the scanning mode by FIG. 2.

Referring now to FIGS. 2 and 2A, the spatial and timing characteristics of the projection and scanning operations provided by the units 10 and 12 are explained. The laser beam is projected onto the workpiece 18 at an angle of about 25–30 degrees from vertical as measured in a plane generally parallel to the groove. The spot is caused to travel a path across the groove, i.e., the beam sweeps through a second plane which intersects the weld groove. Through the aforementioned galvanometric mirror drive means 33, the spot is then returned to the beginning position at a rapid rate and scanned across the groove repetitively. Since the platform 16 is typically moving along the groove, the resulting pattern is a series of parallel stripes across the groove, each being spaced apart in the direction of platform travel.

The TV-scanner camera 12, on the other hand, has a viewing axis which is essentially vertical and a raster scan sensor-strobe function which cuts across the laser spot scan at right angles. Because of the 25–30 degree difference between the projection angle and the viewing angle, the point along any given raster scan at which the TV camera scanner intercepts the laser spot is related to the length of the optical path from the projector 10 to the reflection surface and, hence, to the depth of the groove. This point of interception is determined on the basis of reflected light intensity, i.e., intensity is greatest at the intercept point. The result is a series of digital signals which, taken in their entirety, represent the groove profile over a given laser scan or, if desired, over a series of such scans.

It will, of course, be noted that the scan rate of the TV camera 12 is much higher than that of the projector 10, i.e., the camera scan path cuts across the laser spot path many times during each increment of laser spot movement. In an actual embodiment, the camera 12 exhibits a 248 × 244 pixel array and three complete scans of the array (each scan being hereinafter termed a "frame") occur for each sweep of the laser spot. However, this ratio of frames per spot sweep may be varied from 1:1 to 4:1 or more which alters the signal-to-noise ratio of the input signal to the camera 12. The variation is readily achieved via the programming of the Intel computer 28.

Figure 3:
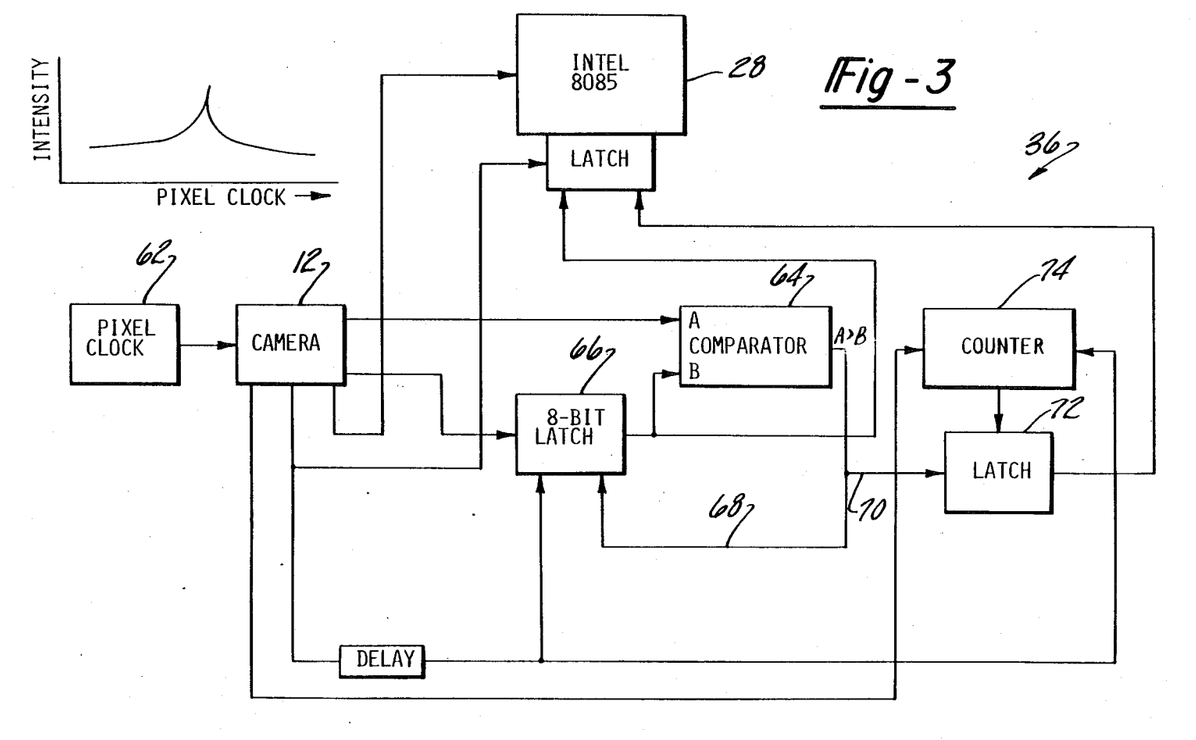
FIG. 3 is a detailed block diagram of an interface between the optical system and a data processor embodiment of FIG. 1.

FIG. 3 illustrates the digital interface 36 in greater detail. This unit presents a series of signals to the Intel computer 28 from which the coordinates of the workpiece surface can be derived at spaced points along the laser spot scan path. From this information, the computer 28 determines the value of the first seven of the output quantities by mathematical calculation.

More specifically, the interface unit 36 provides a digital number (8-bits) representing the pixel clock count at which the camera raster scan intercepts the laser spot during each of the passes of the scan path represented in FIG. 2. By eliminating all pixel counts except the count which represents an interception and, therefor, an actual groove depth, the interface reduces the data processing function of the computer 28 to a significant degree.

The pixel clock 62 effectively strobes the pixels of the sensor array in the camera 12 and scans across the laser path. Each pixel output is effectively a measure of the intensity of the reflected laser light received by that pixel and is applied to one input of a comparator 64 and to an 8-bit latch 66. As long as each new pixel signal (A) is greater than the previous signal (B), the output on line 68 enables the latch 66 which receives and stores the new signal for reference on the next count. The output on line 68 also advances, via line 70, the count stored in the latch 72 from the counter 74. Recognizing that the laser spot reflection spreads appreciably, the pixel outputs continually increases in intensity as long as the camera scan is approaching the center of the reflection. After the center is passed, the intensity of the signals begin to fall off and the condition A>B is not satisfied and the count in latch 72 is not advanced. The stored count remains, therefor, at a number representing the Z coordinate of the work surface at which the intercept occurred. At the end of each camera scan line, an "EOL" signal strobes the count from the latch 72 into the computer 28 as a peak position count and, after a short delay, resets the counter 74 and clears the latch 66. An end-of-frame (EOF) signal from the camera 12 is input to the computer 28 and establishes the portion of the laser spot path which has been examined and digitized (in the preferred embodiment, one-third).

Software involves two major divisions; VIZ, the camera data analysis routine carried out by the Intel 8085, and the track and fill control function carried out by the LSI-11. In addition, the software-controlled functions of the LSI-11 are subdivided into several subroutines, the most important of which are, for example, TRACK, SWING, and FILCTL (fill control).

The camera micro computer 28 is essentially free running, repeating its software cyclicly with no direction from the LSI-11 computer. Once it has finished analyzing an image and transmitted the resulting data to the control computer 38, it takes another image and repeats the cycle. A carriage return character is sent to the control computer 38 to notify it that a new image is being taken. The character catching routine in the control computer 38 recognizes the carriage return as a sync character and saves the current location of all the axis for later use. Once all of the data from the current image has been received by the character catching routine, it activates the routine "TRACK", a representative embodiment of which is shown in flowchart form in FIG. 4.

Figure 4:
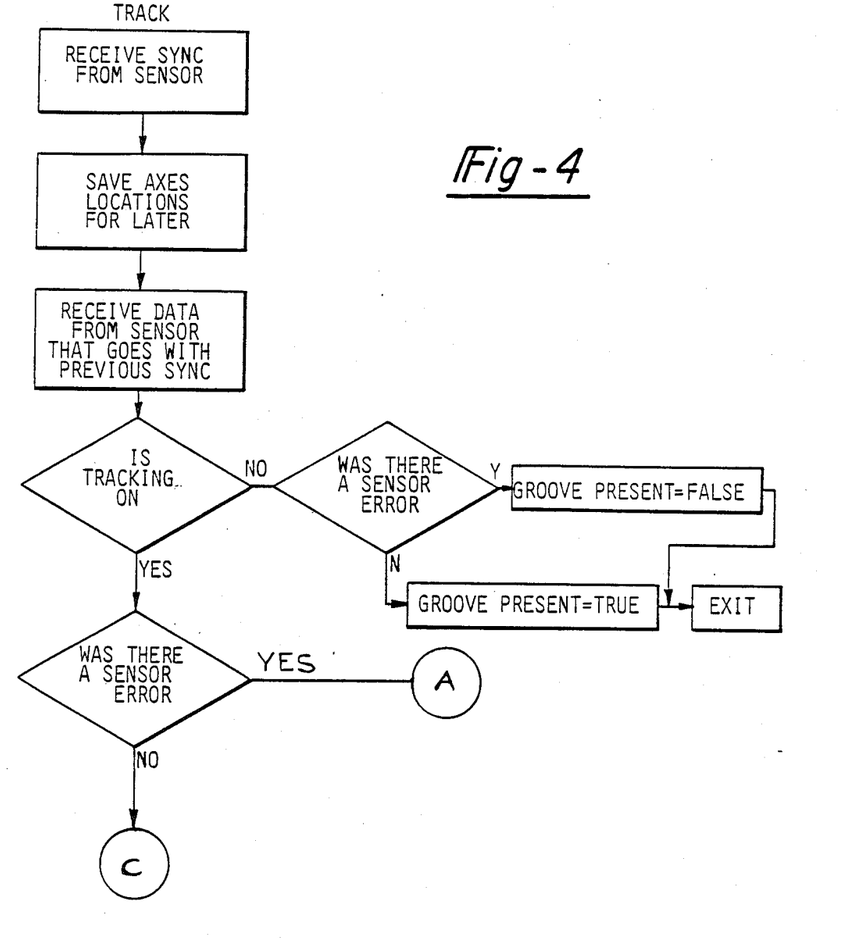
FIGS. 4, 4a and 4b are flowcharts of a portion of the "TRACK" software used in preferred implementation of the apparatus.
Figure 4A:
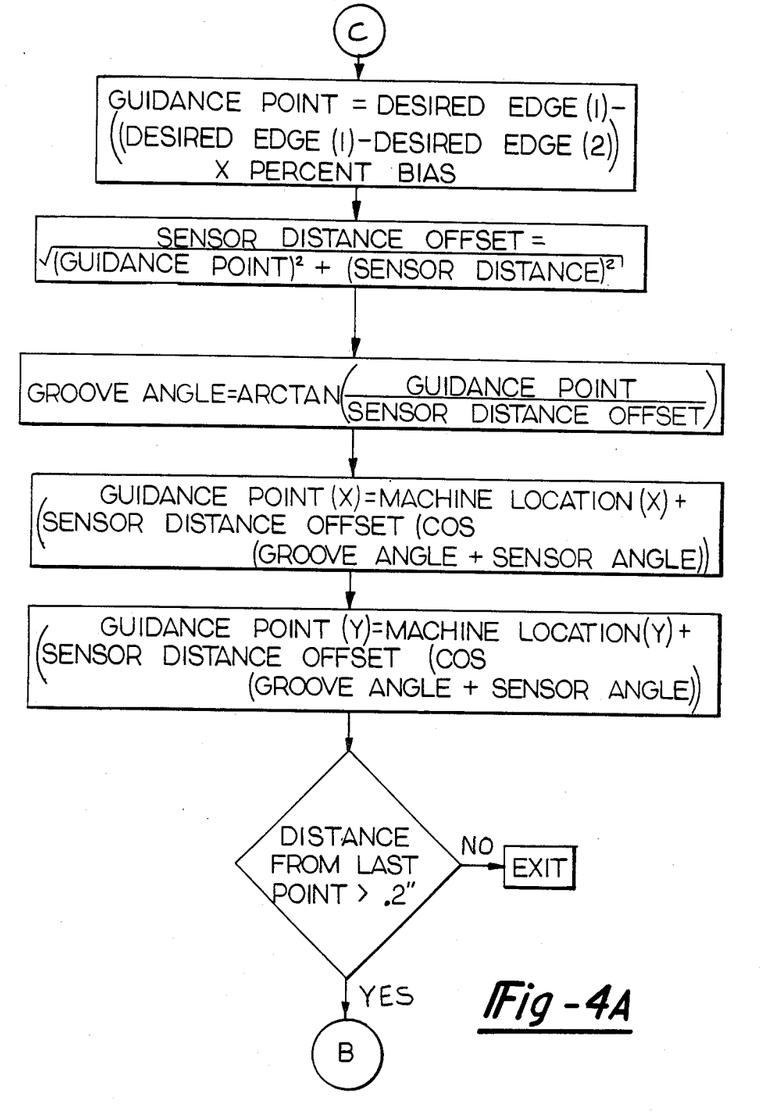
Figure 4B:
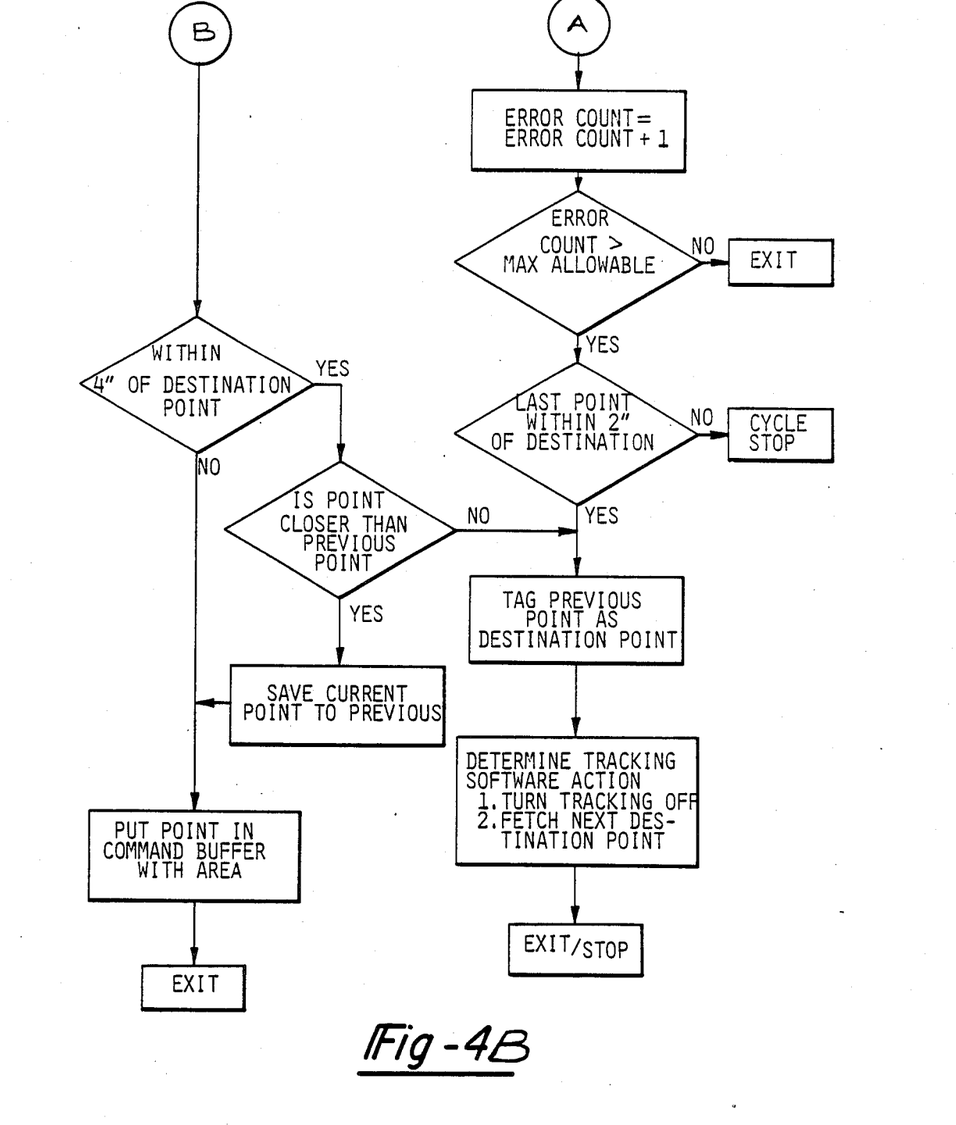

If tracking is not enabled, then TRACK simply sets a software flag "true" if a groove is in the field of view of the camera and "false" if not. If tracking is enabled, then the sensor data and the axis locations saved when the image was taken are used to determine the location of the weld groove. First, the vertical position of the groove is calculated using an average of the right and left edge vertical camera data. This position is then converted from camera units to engineering units. Then the distance from the torch to the laser beam is adjusted based upon the height and the known angle of the laser beam. A combination of the center of area of the groove and the location of the left edge, or right edge, or the center of area and a guidance bias is used to calculate the coordinates of the groove. Standard textbook trig functions are used. The distance from this guidance point to the previously used guidance point is then checked and if that distance is less than some arbitrary minimum, the current point is discarded and the TRACK routine is suspended. If the distance is greater than the minimum allowable value, a test is made to determine if the previously used point is the closest possible point to the current program point. If so, that point is tagged as being the program point and the interpreter for the sensor is called. For the typical case, the next instruction would be to interpret the weld stop program. The first instruction in that program is currently the "tracking off" instruction which causes the whole tracking process to cease.

If, however, the previous point was not the closest to the program point, then the current point is placed in the first in, first out buffer (FIFO). The area of the groove at this point is also placed in the FIFO for use by the fill control routine when the weld torch nears the associated X, Y, Z point.

The "SWING" routine is also called and maintains the sensor approximately centered over the groove ahead of the torch. The swing routine computes the equation of a line which approximates the path of the upcoming groove from some of the most recent points placed into the FIFO. The intersections of a circle whose radius is the distance between the torch and the point where the laser beam strikes the workpiece are calculated. The center of circle is placed at the point toward which the torch is currently traveling. The proper intersection is chosen and the correct sensor head angle is calculated to place the sensor over that intersection. This angle is made part of the current servo command so that as the torch reaches the current command point, the sensor also reaches the desired angle.

The above processes continue until they are stopped by a "tracking off" instruction in the program, a stop button command signal, or the completion of a predetermined number of continuous sensor errors.

Figure 5:
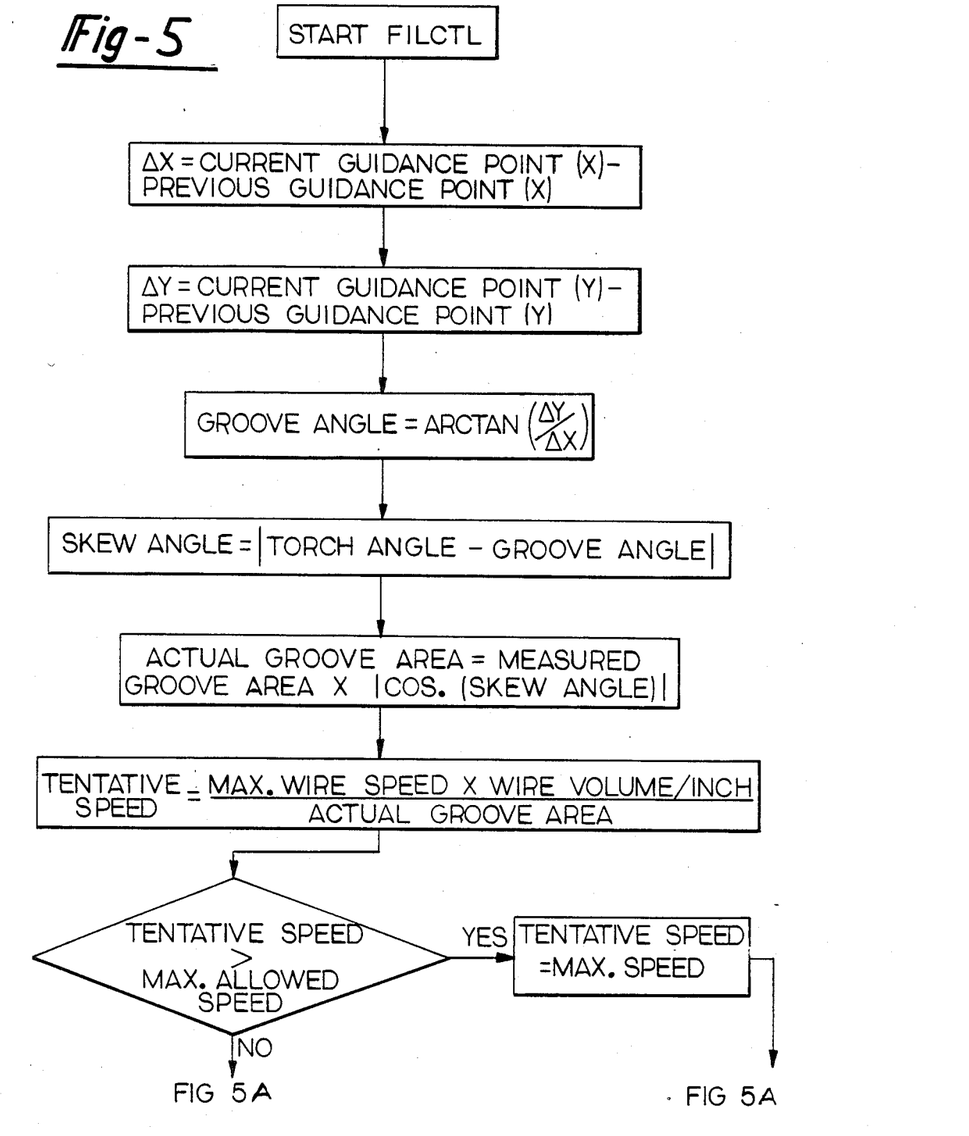
FIGS. 5 and 5A are flowcharts of a portion of the "FILCTL" software used in the preferred implementation of the apparatus.
Figure 5A:
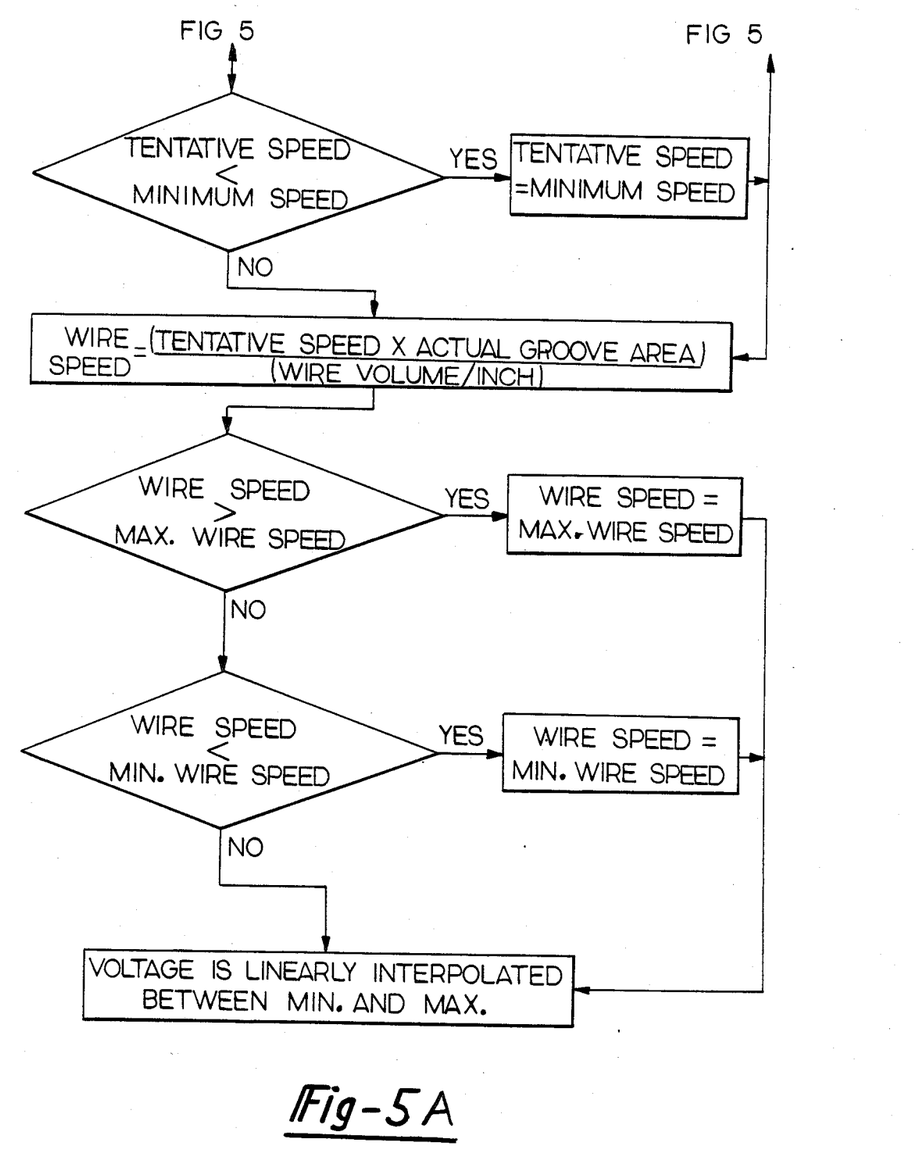

The points are removed from the FIFO as needed and command the computer servo software to move the machine axis. If the system is welding and the fill control is on, the area is also removed from the FIFO and used by the subroutine called "FILCTL". FIGS. 5 and 5A illustrate a flowchart of the FILCTL subroutine and can best be explained in conjunction with the stylized top view of the weld groove 75 shown in FIG. 6. The FILCTL routine begins by computing the change in X and Y coordinates from a previously computed guidance point 76 to the current guidance point 78. The change in X and Y coordinates are used to compute the angle 82 between a line 80 defined by the guidance points 76,78 and the ordinate 84 of the cartesian coordinate system. A line 87 illustrates the angular relationship between the welding torch 14 and optical system 10,12 relative to the ordinate 84 and is monitored by the encoders 26 for calculating an approximation of the skew angle D. The FILCTL program calculates the skew angle 88 as the absolute value of the difference between the torch angle 86 and groove angle 82. This method provides a good approximation of the skew angle D because the line 80 is substantially parallel to the tangent of the radius of the weld groove at the current guidance point. A desired scan path 90 can then be defined as passing through the current guidance point 78 perpendicular to the line 80; consequently, the desired path 90 is positioned normal to the weld groove 75 and provides a true reading of the width of the groove. The actual laser scan path 92 is normal to the line 87 and crosses the weld groove at an angle 88 skewed from the desired path 90 resulting in the detection of an erroneously large weld groove 75. A simple geometric proof is required to show that the torch angle 86 minus the groove angle 82 is equivalent to the skew angle D. First, from the drawing it can easily be concluded that the difference between the angles 86,82 is an angle A. The angle A is obviously equivalent to an angle B. The angle 97 has previously been shown to be 90°; therefor, an angle C is equivalent to 90° minus the angle B. Similarly, the angle 94 has also been shown to be 90°; therefor, the skew angle D is equivalent to 90° minus the angle C. From this it is easily deduced that the skew angle D is equal to the difference of the groove and torch angles 82,86.

Figure 6:
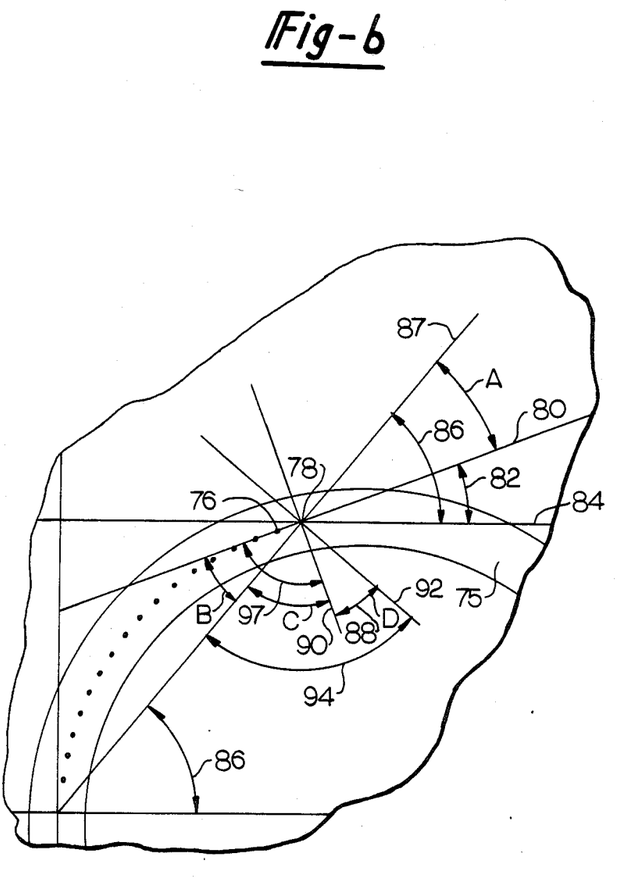
FIG. 6 is a stylized top view of a welding groove and the angular relationship between the welding torch, optical system, and weld groove.

More simply:

$$\angle A = \angle B$$
$$\angle C = 90° - \angle B$$
$$\angle D = 90° - \angle C$$
$$\angle D = 90° - (90° - \angle B)$$
$$\angle D = \angle B$$
$$\therefore \angle D = \angle A$$

Once the skew angle D has been computed, then the FILCTL routine multiples the absolute value of the cosine of the skew angle D by the measured groove area to obtain a corrected actual groove area. The absolute values are taken to remove the negative value in the case where the weld groove angle curves in the opposite direction to that shown in FIG. 6. In an instance where the apparatus 10 is welding a linear portion of a groove such that a skew angle does not exist, then the groove and torch angles 82,86 will be equivalent and the skew angle D will be zero. The cosine of zero is equal to one and the actual groove area will be equivalent to the measured groove area.

The FILCTL program continues and computes a tentative welding torch travel speed based on the maximum allowable wire feed speed, the volume of wire per inch, and the actual groove area. The tentative speed is then compared to a range of allowable speeds. If the tentative speed is within the range, then the wire feed speed is recalculated to be the maximum allowable speed. If, however, the tentative speed is outside the allowable range, then tentative speed is set to the closest value of either the maximum or minimum torch travel speed. The wire feed speed is then calculated based on the new tentative speed and compared to a range of allowable wire feed speeds. If the wire feed speed is outside of the allowable range, then the wire speed is set to the closest value of the maximum and minimum allowable wire feed speeds. The welding voltage is then linearly interpolated based on the computed wire feed speed and torch travel speed.

Figure 7:
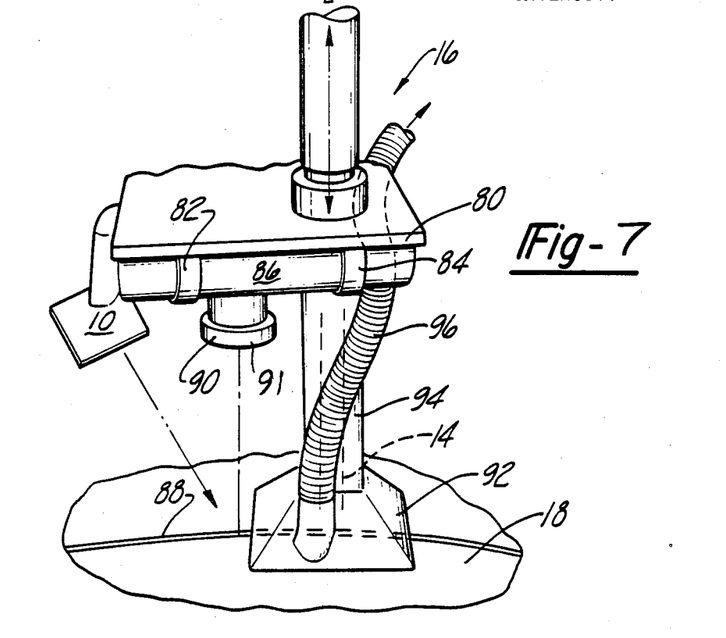
FIG. 7 is a side view of a carriage apparatus for certain optical and mechanical components of the FIG. 1 embodiment.

FIG. 7 is a view of a preferred, actual embodiment of the system of FIGS. 1 and 3 of a single torch MG welder. The platform 16 comprises a servo-positionable structure depending from a cross beam and is movable vertically relative to the workpiece 18 along the Z-axis. A plate 80 has depending arms 82 and 84 and carries a conventional low-power helium-neon laser 86 which projects its output beam laterally via mirrors to the scan-projector 10 containing the galvo-driven mirror which aims the beam downwardly toward the groove 88 in the workpiece 18.

A camera lens 90 of the camera 12 is stationed about 10 inches above the work 18 and focuses on a spot about four inches ahead of the torch 14. A filter 91 mounted on the lens end of the camera 12 passes light only at 632.8 nanometers; i.e., the wavelength of the laser output, and filters out glare from the welding torch 15 which leaks out from under a shield 92 carried at the bottom of the plate 94. A vacuum system comprising one or more hoses 96 removes smoke from the weld area.

Swing motion about the Z-axis is produced by a motor 110. Since the Z-axis runs through the center of the torch, swing movements do not affect the X, Y, Z coordinates of the torch itself. Such movements, do, however, affect the X, Y coordinates of the scan area and thereby permit the optical system 10, 12 to follow curves in the groove 88 ahead of the weld coordinates.

Figure 8:
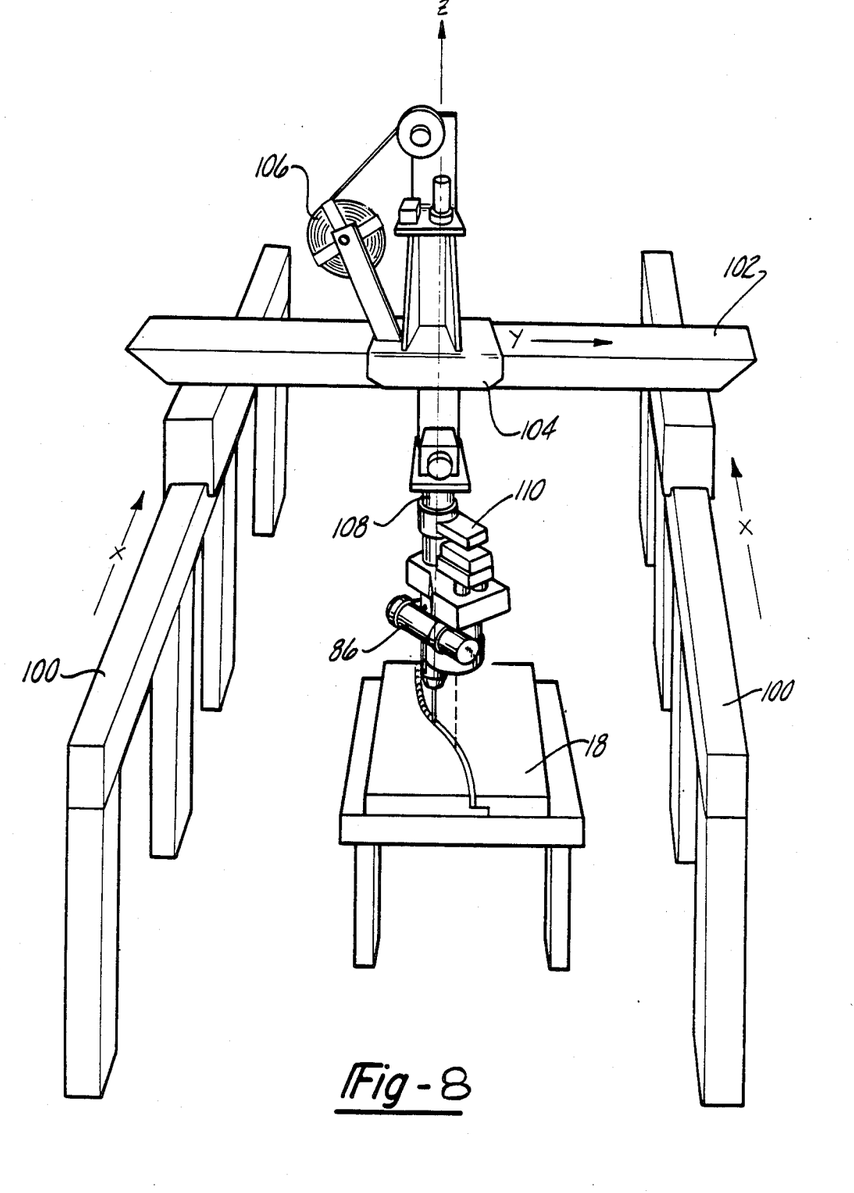
FIG. 8 is a perspective drawing of a three axis welding apparatus.

FIG. 8 shows in greater detail the physical arrangement of the guidance system. X-axis displacement is provided by spaced parallel rails 100 raised above the floor and open-ended to provide entry and exit for the work: A Y-axis support 102 spans the two rails 100 and is mounted thereon by way of wheels to allow displacement. A linear gear-tooth track runs along one of the rails and is engaged by a pinion gear driven by a belt-connected motor and gear-box combination. An encoder above the motor generates pulses representing displacement. The Y-axis carriage 104 is similarly mounted on support 102 and carries the wire reel 106 and wire feed motor. A X-axis drive 108 raises and lowers the platform 16 relative to support 102 and carriage 104 for height control. The swing axis system is described previously.

INDUSTRIAL APPLICABILITY

In the overall operation of a preferred embodiment of the adaptive welding apparatus 8, assume that a curved portion of a curvilinear weld groove is being detected and welded. The optical system 10,12 preceeds the welding torch 14 by about four inches, projecting a spot of light onto the surface of a workpiece and scanning the light linearly across a weld groove. Light reflected from the surface of the workpiece is received by the camera 12 which employs the principal of triangulation to extract topographical information from the points of peak reflected intensity. The topographical information yields the weld groove position and cross sectional area. The software routine, SWING, constantly attempts to center the laser scan path across the weld groove; however, by rotating the optical system 10,12 about the welding torch 14, the laser scan path will traverse the weld groove along a line skewed from the path necessary to detect actual groove width. The skewed scan path will detect an erroneously wide groove and then calculate a groove cross sectional area that will cause the system to deposit weld material at an excessive rate, overfilling the groove. The software routine, FILCTL, acts to compensate for the skewed scan path by estimating the desired linear scan path from both present and past information. Once the desired scan path is known, then the actual scan path is measured and the skew angle can be analytically calculated. The actual scan path can be mathematically rotated to the desired scan path by multiplying the actual path by the cosine of the skew angle; however, in this embodiment an attempt is made to rotate the actual area to the desired scan path by multiplying by the cosine of the skew angle. Unless the groove has a rectangular cross section, then a certain amount of error is introduced by attempting to rotate the actual area, but the error is considered to be insignificant and has little effect on the actual weld material deposition rate.

Other aspects, objects, advantages, and uses of this apparatus can be obtained from a study of the drawings, the disclosure, and the appended claims.

I claim:

1. A welding apparatus for guiding a welding torch along a weld groove, scanning a sensor along a preselected pathway extending across said weld groove at a preselected distance from said welding torch, and adaptively controlling at least one of a weld voltage, wire feed speed, and welding torch travel speed in response to the scanned weld groove cross sectional area, comprising:

first means for delivering first signals in response to the position and configuration of the weld groove cross section;

second means for receiving said first signals, calculating the weld groove cross sectional area, and delivering a second signal in response to the magnitude of said calculated area;

means for calculating a series of guidance points along said weld groove;

third means for receiving said second signal, calculating the magnitude of a first angle formed by the intersection of a preselected reference line and a first line extending through a current guidance point and a previous guidance point, calculating the magnitude of a second angle formed by the intersection of said preselected reference line and a second line extending through the current guidance point and the current welding torch location, calculating a general angular deviation from the difference between said first and second angles, altering said second signal in response to the magnitude of said angular deviation, and delivering a resulting third signal; and fourth means for receiving said third signal and controlling the volume of weld material deposited in said weld groove in response to said third signal.

2. An apparatus, as set forth in claim 1, wherein said third signal is the product of said second signal and the absolute value of the cosine of said angular deviation.

3. An apparatus, as set forth in claim 1, wherein said fourth means controls the volume of weld material deposited in said weld groove in response to controlling at least one of said wire feed speed and said welding torch travel speed.

4. A method for adaptively controlling the wire feed rate, torch velocity, and weld voltage of a welding apparatus to control the deposition of material within a weld groove, comprising:

detecting the cross sectional area of said weld groove;

calculating a tentative torch speed in response to both the magnitude of the cross sectional area and a preselected maximum wire feed rate;

comparing said tentative torch speed to a preselected maximum and minimum allowable torch speed;

altering said tentative torch speed to a value within the range of said minimum and maximum torch speed in response to said tentative torch speed being outside the range of said maximum and minimum allowable torch speeds;

delivering a torch speed signal having a magnitude responsive to the magnitude of said tentative torch speed;

calculating a wire feed rate responsive to both the cross sectional area and the tentative torch speed;

comparing said wire feed rate to a preselected maximum and minimum allowable wire feed rate;

altering said wire feed rate to a value within the range of said minimum and maximum wire feed rates in response to said calculated wire feed rate being outside the range of said maximum and minimum allowable wire feed rates;

delivering a wire feed rate signal having a magnitude responsive to the magnitude of said wire feed rate;

calculating the weld voltage in response to the magnitude of said wire feed rate;

delivering a weld voltage signal having a magnitude responsive to the magnitude of said calculated weld voltage;

controlling the speed of said welding torch in response to the magnitude of said desired torch speed signal;

controlling the wire feed rate in response to the magnitude of said wire feed rate signal; and controlling the weld voltage in response to the magnitude of said weld voltage signal.

5. The method, as set forth in claim 4, wherein the step of altering said tentative speed includes setting said tentative speed to the minimum allowable torch speed in response to the tentative torch speed being less than said minimum allowable torch speed.

6. The method, as set forth in claim 4, wherein the step of altering said tentative speed includes setting said tentative speed to the maximum allowable torch speed in response to the tentative torch speed being greater than said maximum allowable torch speed.

7. The method, as set forth in claim 4, wherein the step of altering said wire feed rate includes setting said wire feed rate to the minimum allowable wire feed rate in response to the wire feed rate being less than said minimum allowable wire feed rate.

8. The method, as set forth in claim 4, wherein the step of altering said wire feed rate includes setting said wire feed rate to the maximum allowable wire feed rate in response to the wire feed rate being greater than said maximum allowable wire feed rate.

9. The method, as set forth in claim 4, wherein the step of calculating the weld voltage includes linearly interpolating the weld voltage between a minimum and maximum value in response to the magnitude of said wire feed rate.

* * * * *